US012797756B2

(12) United States Patent
Zamperla et al.

(10) Patent No.: US 12,797,756 B2
(45) Date of Patent: Nov. 17, 2026

(54) SYSTEM AND METHOD FOR CONTROLLING CAROUSELS

(71) Applicants: ANTONIO ZAMPERLA S.P.A., Altavilla Vicentina (IT); XTEAM SOFTWARE SOLUTIONS SOCIETA' A RESPONSABILITA' LIMITATA SEMPLIFICATA, Giacciano con Baruchella (IT)

(72) Inventors: Antonio Zamperla, Vicenza (IT); Fabio Berti, Verona (IT); Stefano Tamascelli, Giacciano con Baruchella (IT)

(73) Assignees: ANTONIO ZAMPERLA S.P.A., Altavilla Vicentina (IT); XTEAM SOFTWARE SOLUTIONS SOCIETA' A RESPONSABILITA' LIMITATA, Giacciano County Baruchella (IT)

( * ) Notice: Subject to any disclaimer, the term of this patent is extended or adjusted under 35 U.S.C. 154(b) by 294 days.

(21) Appl. No.: 18/604,788

(22) Filed: Mar. 14, 2024

(65) Prior Publication Data

US 2024/0316470 A1 Sep. 26, 2024

(30) Foreign Application Priority Data

Mar. 21, 2023 (IT) ........................ 102023000005340

(51) Int. Cl.
*A63G 1/00* (2006.01)
*G06V 20/52* (2022.01)

(52) U.S. Cl.
CPC ............... *A63G 1/00* (2013.01); *G06V 20/52* (2022.01)

(58) Field of Classification Search
CPC ............. G06V 20/52; A63G 1/00; A63G 7/00
See application file for complete search history.

(56) References Cited

U.S. PATENT DOCUMENTS 10,449,462 B2 * 10/2019 Woodcock .............. G06T 13/80
10,514,933 B2 12/2019 Maycock et al.
(Continued)

FOREIGN PATENT DOCUMENTS

WO 9505223 A1 2/1995

OTHER PUBLICATIONS

European Search Report for EP 24164517.5 Mailed on Jul. 25, 2024.
(Continued)

*Primary Examiner* — Nathan J Flynn
(74) *Attorney, Agent, or Firm* — Rivka Friedman

(57) ABSTRACT

Control system for carousels, which comprises a carousel provided with a control unit for detecting operative parameters of the carousel, and with a transmission unit for transmitting a succession of acquired values of the operative parameters. The control system also comprises a portable electronic device provided with a video camera for filming the carousel, and with a communication unit for receiving the acquired values of the operative parameters. The electronic device comprises a processing unit arranged for actuating the video camera to film the carousel and acquire a sequence of frames. The processing unit synchronizes the acquired values of the operative parameters with the frames generated by the video camera, and applies to the acquired values an interpolation function, which calculates interpolated values of the operative parameters that are then associated with corresponding frames.

10 Claims, 4 Drawing Sheets

(56) References Cited

U.S. PATENT DOCUMENTS

| | | | |
|---|---|---|---|
| 2007/0021845 A1 | 1/2007 | Schweizer et al. |
| 2018/0140957 A1 | 5/2018 | Woodcock |
| 2019/0054941 A1 | 2/2019 | Hydro |

OTHER PUBLICATIONS

Italian Search Report for IT 202300005340 Mailed on Oct. 6, 2023.

* cited by examiner

SYSTEM AND METHOD FOR CONTROLLING CAROUSELS

FIELD OF APPLICATION

The present invention regards a system and method for controlling carousels.

The present system and method are advantageously inserted in the field of amusement parks, and in particular in the field of production of carousels and equipment for amusement parks.

In particular, the system and the method are aimed to allow the correct management and maintenance of the carousels present in one or more amusement parks.

STATE OF THE ART

The amusement parks, by now widespread, generally comprise a great number of carousels and attractions for the public at their interior.

In particular, many of the carousels present in amusement parks (such as amusement parks, panoramic wheels, flying discs etc.) as is known have large-size structures on which multiple movable parts are mounted, which are driven in an automated manner by various motor groups or actuator groups.

For example, the carousels which comprise multiple movable cars along a rail (such as roller coasters) are provided with numerous electrical, hydraulic or pneumatic actuation devices, as well as with numerous sensors, in order to drive the advancement, the acceleration, the slowing and the stopping of the cars in a controlled manner according to the provided specifications and ensure the required safety standards.

The increasingly high structural and operative complexity of the carousels involves an increasingly greater difficulty in managing the correct operation thereof, as well as, in particular, preventing possible failure that can involve machine stops.

On such matter, known from the U.S. Pat. No. 10,514,933 B2 is a control system of a carousel (of roller coasters) which comprises a control unit which communicates, by means of wireless transmission, with a drive device mounted on each car of the carousel, in particular in order to receive from such drive device a series of operative parameters relative to the corresponding car, such as position, speed, motor data and brakes data, load on board, etc.

The data acquired, in addition for controlling the carousel (for example, in order to synchronize the movements of the cars), can also be used for planning specific maintenance interventions (e.g. based on the work cycles over time). In addition, the control unit can send suitable instructions to the drive devices in order to automatically convey, towards a suitable hangar, the cars that require maintenance.

The control systems of known type for the amusement parks nevertheless have various limits, in particular tied to the possibility of previously and reliably identifying possible failures or irregularities of the carousel.

In particular, the data acquired by the control system do not allow suitably correlating the various acquired data with possible events that can be verified on the carousel, nor by operators who work remotely nor by possible operators on site.

In addition, the parameters that can be detected by the control system are generally quite numerous (even many dozens for each carousel), involving a high size of the data to be transmitted or to be stored, both in a remote server (also cloud) and in a local device in the park or in the carousel itself. The acquisition and the storage of such high amount of data are therefore not always easy, in particular without the use of complicated and costly computing structures.

For such reason, often the control systems of known type are limited to transmitting at most a dozen of the acquired parameters to the remote services, allowing the operators who work remotely to access only a small part of the available information.

In addition, the management from a remote server or cloud is not possible in parks where a particularly powerful wi-fi transmission and/or Internet connection are not available, for example due to the technology present in the country of the park or management policies of the latter.

PRESENTATION OF THE INVENTION

Main object of the present invention is therefore that of overcoming the drawbacks manifested by the solutions of known type considered above by providing a system and a method for controlling carousels that allow reliably detecting, in a timely manner, possible failures or problems of the carousel which require repair or maintenance interventions.

Further object of the present invention is to provide a system and a method for controlling carousels which allow an operator on site to carry out a substantially complete control analysis of the carousel.

Further object of the present invention is to provide a system and a method for controlling carousels which allow efficiently managing a high number of carousels placed in one or more different parks.

Further object of the present invention is to provide a system and a method for controlling carousels which require limited implementation and management costs.

BRIEF DESCRIPTION OF THE DRAWINGS

The technical characteristics of the invention, according to the aforesaid objects and the advantages thereof, will be more evident in the following detailed description, made with reference to the enclosed drawings, which represent a merely exemplifying and non-limiting embodiment of the invention, in which.

DETAILED DESCRIPTION

With reference to the enclosed drawings, reference number 1 overall indicates the control system for carousels, object of the present invention.

The present control system 1 is advantageously intended to be used for optimizing the management of one or more carousels (in one same amusement park or different parks), in particular for monitoring the correct operative state of the carousels and establishing or planning, ahead of time, maintenance or repair interventions.

Figure 1:
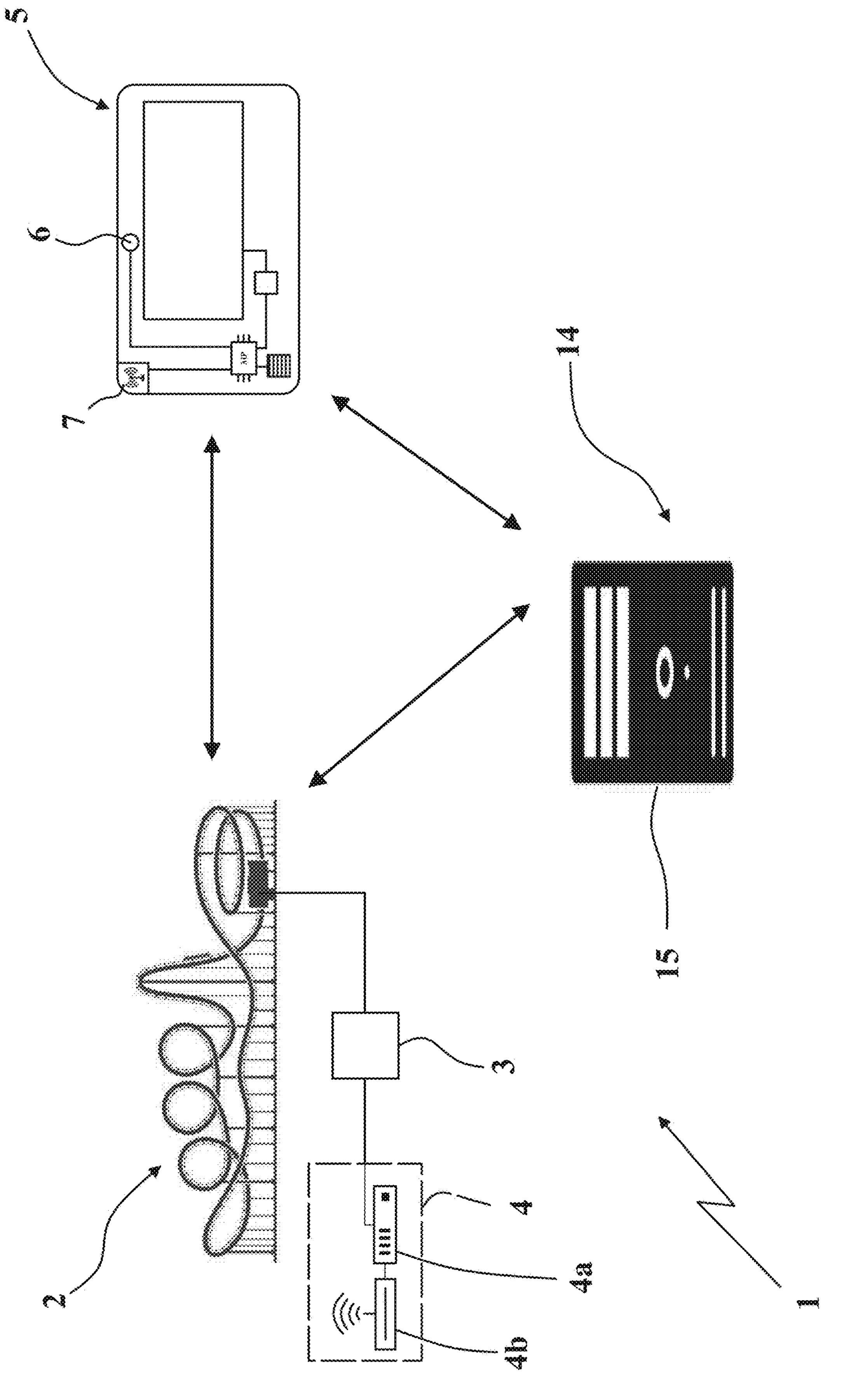
FIG. 1 shows a main scheme of the control system for carousels, object of the present invention.

With reference to the exemplifying scheme illustrated in FIG. 1, the present control system 1 comprises at least one carousel 2 installed for example in an amusement park. Of course, as indicated above, the control system 1 can comprise multiple carousels (installed in the same park or in different parks), that which will be discussed hereinbelow for the carousel 2 being applicable for each additional carousel forming part of the system 1 itself. Advantageously, in a per se known manner, the carousel 2 comprises a support structure fixed to the ground and one or more multiple members mounted on such support structure.

The carousel 2 also comprises actuation systems arranged for moving the movable members in an automated manner and which can be in particular of mechanical, electrical, hydraulic or pneumatic type.

The carousel 2 can be of any type (e.g. roller coasters, panoramic wheels, flying discs, flying chairs, train, carousel, etc.) whose components are generically described are per se known known to the man skilled in the art and hence will not be further described in the present document.

For example, the carousel 2 can be of roller coaster type, in which the support structure comprises a support framework for one or more rails, the mobile members comprise one or more cars mounted on the rail, and the actuation systems comprise all the components (motors, actuator, brake groups, electrical and/or hydraulic systems, valves, etc.) which determine the movement of the cars along the rail.

The carousel 2 comprises a control unit 3 (in particular of electronic type), which advantageously is operatively connected to the actuation systems in order to monitor and/or drive their operation.

Preferably, the control unit 3 comprises one or more computers. For example, the control unit 3 comprises a central control module (such as a PLC or a centralized computer) connected to the different components of the carousel 2, and/or multiple local modules (e.g. constituted by PLCs), each associated with a corresponding component of the carousel 2, for example a movable member of the latter (such as a car of the roller coasters).

The control unit 3 is arranged for detecting at least one operative parameter P associated with the carousel 2 itself, and preferably multiple different operative parameters P, each indicative of the state or of a characteristic of the carousel 2 or of a component thereof, and which provide useful information for verifying the conduct of the carousel 2 in operation and detect possible irregularities thereof.

For example, the aforesaid operative parameters P can comprise the output current or the output voltage of an electric motor, the number of cycles executed by the carousel 2, a state variable relative to the actuation command for a valve, the oil pressure of a hydraulic component, the position of a cylinder, a Boolean variable relative to the exceeding of a specific operative threshold (e.g. the limit temperature of the oil of a motor), etc.

The control unit 3 is arranged, in particular based on the type of operative parameter P, to acquire the latter directly (at the central module or local modules) and/or through suitable sensor systems of the carousel 2, such as temperature sensors, pressure sensors, inertia sensors, vibration sensors, acoustic sensors, encoders, etc.

The carousel 2 also comprises at least one transmission unit 4 operatively connected to the control unit 3 and arranged for transmitting a first data set containing a first succession of acquired values Va of the operative parameter P provided by the control unit 3 itself.

In particular, the transmission unit 4 is arranged for processing the data (containing the acquired values Va of the operative parameters P) provided by the control unit 3 so as to generate the aforesaid first data set in a suitable format (and preferably optimized) for the transmission (wireless or wired) to other components of the control system 1, as described in detail hereinbelow.

The processing operations executed by the transmission unit 4 can comprise, for example, operations of encoding, conversion, selection (e.g. for transmitting only several of the operative parameters P provided by the control unit 3), etc., which can per se be of conventional type and thus is not described in detail herein.

In accordance with a particular embodiment, the transmission unit 4 comprises one or more components hardware separate from the control unit 3. Advantageously, the transmission unit 4 comprises an acquisition device 4*a* (such as an industrial computer, for example with an edge architecture), which is in data communication with the control unit 3 in order to receive from the latter the operative parameters P of the carousel 2 and is arranged for generating the first data set to be transmitted. In addition, the transmission unit 4 preferably comprises a transceiving device 4*b*, such as a router, in particular provided with an antenna radio, connected to the acquisition device 4*a* and arranged for implementing the transmission of the first data set. Advantageously, the transmission unit 4 can be implemented in one or more modules (each comprising in particular corresponding acquisition devices 4*a* and transceiving devices 4*b*), including a central module connected to the central control module of the control unit 3, and/or multiple peripheral modules, each of which connected to the corresponding local module of the control unit 3 and is suitably mounted on the same movable member (e.g. a car) of the carousel 2.

In accordance with a different embodiment, the transmission unit 4 is integrated within the control unit 3, in particular in its central control module and/or in its local modules.

According to the present invention, the control system 1 comprises a portable electronic device 5, which is intended to be provided for example to an operator of the amusement park in which the carousel 2 is installed, who can be an employee of the park or an operator of an outside company (possibly the same producer company) who manages the maintenance of the carousel 2.

Advantageously, the control system 1 comprises multiple aforesaid electronic devices 5, intended to be employed by the operators in the same amusement park or in multiple parks in which carousels 2 are installed belonging to the control system 1.

For example, the electronic device 5 can be a tablet, a portable computer, an augmented reality visor (e.g. in the form of eyeglasses), etc.

Figure 2:
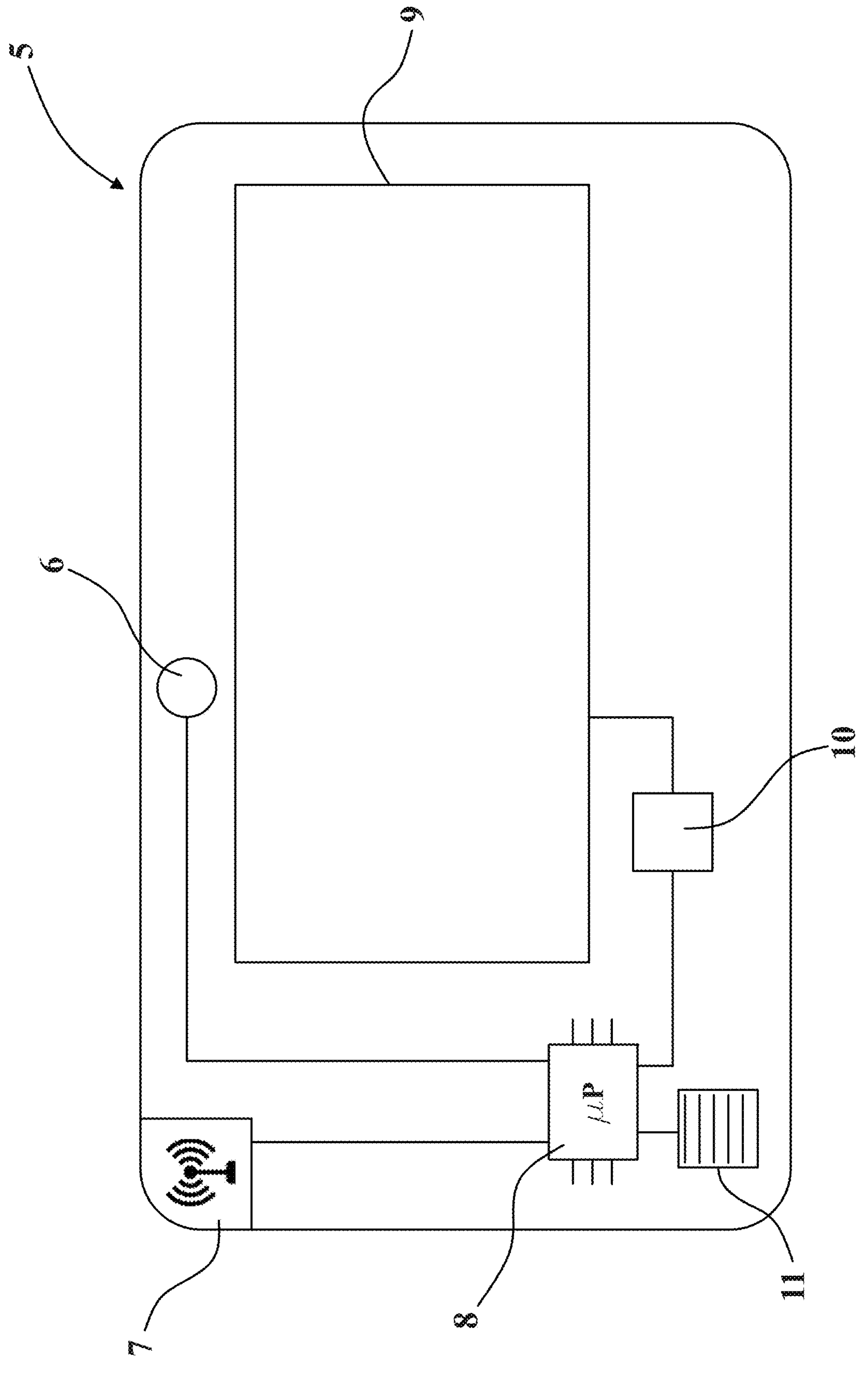
FIG. 2 shows, in schematized form, a particular present control system, relative to a portable electronic device.

With reference to the example of FIG. 2, the electronic device 5 comprises a video camera 6 actuatable for filming videos, in particular of the carousel 2 (as discussed hereinbelow). More in detail, the video camera 6 is of digital type and is arranged for acquiring videos with a given frame rate (e.g. 30 or 60 fps).

The electronic device 5 also comprises a communication unit 7 arranged for communicating (in particular by means of wireless communication) with the transmission unit 4 of the carousel 2, in particular so as to receive the first data set containing the operative parameters P acquired by the control unit 3 of the carousel 2 itself.

In particular, the communication unit 7 comprises a transceiving module thereof, in particular provided with an antenna, adapted to detect the first data set sent, in radio signal form, from the transmission unit 4. Preferably, alternatively or additionally, the communication unit 7 comprises at least one communication port arranged for being connected via cable to the transmission unit 4 (suitably provided with suitable connection port) so as to implement the transmission data in wired form.

Advantageously, the communication unit 7 is arranged for acquiring and decoding the first data set, so as to convert it into a format readable by further components of the electronic device 5 described hereinbelow.

The electronic device 5 also comprises a processing unit 8 (for example comprising a microprocessor) operatively connected to the video camera 6 and to the communication unit 7, in particular in order to process the first data set and the videos provided, respectively, by the latter.

Advantageously, the electronic device 5 comprises a screen 9 operatively connected to the processing unit 8 and, in particular, controlled by the latter through a suitable video module 10 (e.g. a video card, also integrated in the processing unit 8 itself).

Advantageously, the electronic device 5 comprises a memory 11 operatively connected at least to the processing unit 8 and adapted to archive (possibly temporarily) the data acquired and generated by the electronic device 5.

As indicated above, the transmission unit 4 of the carousel 2 is arranged for transmitting to the communication unit 7 of the electronic device 5 the first data set containing the first succession of acquired values Va of the operative parameters P acquired by the control unit 3 of the carousel 2.

The transmission unit 4 transmits the first data set with a given first sampling frequency (e.g. 25 Hz), which can be determined for example by the performance of the computer of the transmission unit 4 and/or by the sampling frequency with which the data relative to the operative parameters P are acquired by the control unit 3.

In the first succession of the first data set, each acquired value Va is associated with a corresponding first (sampling) time instant $t_1$ which is determined by the aforesaid first sampling frequency and which is indicative of the instant in which the operative parameter P took on the acquired value Va associated therewith.

In particular, the first data set contains a first time stamp given by the succession of the first time instants $t_1$ associated with the corresponding acquired values Va of the operative parameter P.

The processing unit 8 of the electronic device 5 is arranged for actuating the video camera 6 to film at least one part of the carousel 2 in a given time interval, in particular during the operation of the carousel 2 itself. Such actuation is for example enabled to follow a start command made by the operator on the electronic device 5.

Following such actuation of the video camera 6, the latter is adapted to acquire video data which contain a sequence of frames F that constitute a video of the carousel 2 in the aforesaid time interval.

More in detail, the video camera 6 acquires the frames F with a given second sampling frequency, which in particular corresponds with the frame rate of the video camera 6 itself. In the sequence of frames F, each frame F is associated with a corresponding second (sampling) time instant t2 which is determined by the aforesaid second sampling frequency of the video camera 6 and is indicative of the instant in which the carousel 2 appears as in the frame F associated therewith.

In particular, the video data generated by the video camera 6 contain a second time stamp given by the succession of the second time instants $t_2$ associated with the corresponding frames F.

The second sampling frequency (e.g. 60 Hz) of the video camera 6 is greater than the first sampling frequency (e.g. 25 Hz) with which the first data set (containing the acquired values Va of the operative parameters P of the carousel 2) is transmitted by the transmission unit 4 of the carousel 2 to the communication unit 7 of the electronic device 5. Of course, during the time interval, the video camera 6 can be directed and set by the operator in order to film the entire carousel 2 or only one or more parts of interest of the latter, as a function of the specific control needs.

The processing unit 8 of the electronic device 5 is advantageously arranged for actuating the communication unit 7 of the latter to initialize the transmission unit 4 of the carousel 2 for the transmission of the first data set. The communication unit 7 is then adapted to receive, from the transmission unit 4 of the carousel 2, the first data set containing the acquired values Va of the operative parameter P which were acquired by the control unit 3 of the carousel 2 during the time interval in which the video camera 6 films the video of the carousel 2 itself.

Advantageously, since the time of the start of such transmission, there is a continuous reception of the first data set (structured in particular in data packets) from the transmission unit 4 of the carousel 2 to the communication unit 7 of the electronic device 5. Preferably, each data packet comprises the acquired values Va of the operative parameters P of the carousel 2 in the corresponding first time instant $t_1$. In particular, during the time interval in which the video camera 6 films the carousel 2, the communication unit 7 of the electronic device 5 receives a number of data packets that is proportional to the first sampling frequency of the transmission unit 4 of the carousel 2.

Advantageously, when the video camera 6 is started, the processing unit 8 is arranged (in particular automatically by means of trigger sent by the transmission unit 4 or by means of command of the operator) to initialize a process for saving the video data generated by the video camera 6 and the first data set containing the acquired values Va of the operative parameters P and received by the transmission unit 4 of the carousel 2.

Advantageously, the first data set and the video data are stored in the memory 11 of the electronic device 5.

The processing unit 8 of the electronic device 5 is arranged for synchronizing the first time instants $t_1$ (associated with the first succession of acquired values Va of the operative parameter P) with the second time instants $t_2$ (associated with the time sequence of the frames F).

Advantageously, such synchronization is executed by the processing unit 8 by subtracting, from the first time instants $t_1$, a given delay time determined by the transmission of the first data set by the transmission unit 4 of the carousel 2 to the communication unit 7 of the electronic device 5.

In particular, the aforesaid delay time is indicative of the time that the first data set (e.g. in radial signal form, in the case wireless transmission) employs for traveling from the transmission unit 4 of the carousel 2 to the communication unit 7 of the electronic device 5.

Such delay time is advantageously calculated by means of processes that are per se known (for example based on median values) and is on the order of several milliseconds (e.g. 50 ms).

The aforesaid synchronization operation allows aligning the initial time instants of the first succession of acquired values Va of the operative parameter P and of the sequence of frames F, identifying therefore a common time origin of the time interval in which such data are acquired.

However, as indicated above, the first sampling frequency of the acquired values Va of the operative parameter P is different from the second sampling frequency of the frames F, and in particular the latter is greater than the first.

Figure 4:
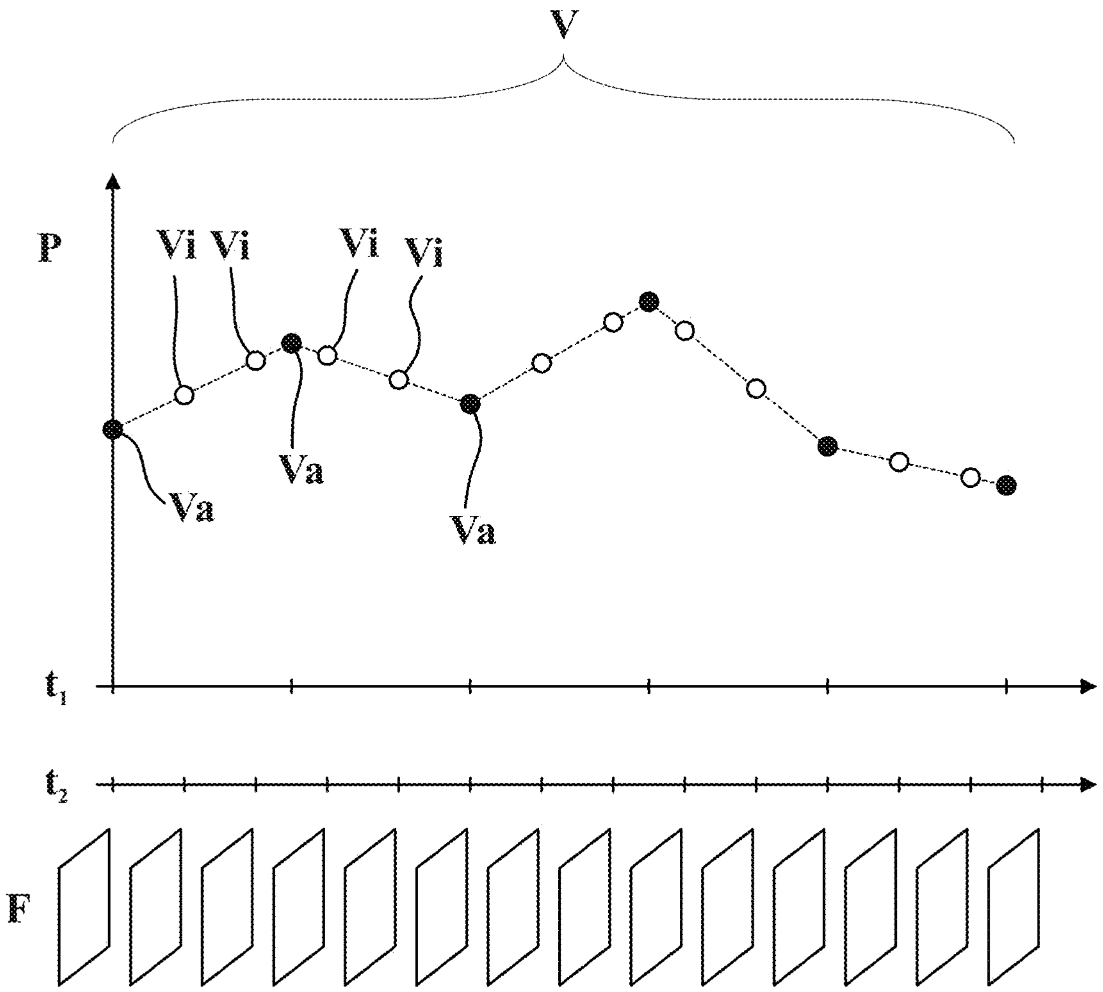
FIG. 4 shows several graphs which represent, in an exemplifying manner, corresponding operative parameters processed by the present system and by the present method.

Therefore, as schematically represented in the graphs of the example of FIG. 4, even if the acquired values Va and the frames F have a same time origin, the first time instants $t_1$ (determined by the first sampling frequency) do not coincide with the second time instants $t_2$ (determined by the second sampling frequency). In particular, even if the second sampling frequency was a multiple of the first sampling frequency (as in the example of FIG. 4), between two first adjacent time instants $t_1$ there would be one or more second time instants $t_2$. This means that, for the frames F associated with the latter second time instants $t_2$, acquired values Va of the operative parameter P are not present and, therefore, the values which the operative parameter P acquires when the carousel 2 is represented in the frames F associated with the aforesaid second time instants $t_2$, that fall between two successive first time instants $t_1$, would not be available.

For the purpose of resolving such technical problem, the control system 1, object of the present invention, provides that the processing unit 8 of the electronic device 5 be arranged for applying, to the succession of acquired values Va of the operative parameter P, at least one interpolation function, which, based on such acquired values Va, calculates interpolated values Vi of the operative parameter P that are associated with second time instants $t_2$ which are prior to and/or following each first time instant $t_1$.

The processing unit 8 is also arranged for generating a second data set containing a second succession of values V of the operative parameter P obtained from the aforesaid interpolated values Vi (and advantageously from the acquired values Va), in which each value V of such second succession is associated with a corresponding second time instant $t_2$.

In accordance with the example of FIG. 4, the aforesaid second succession of values V is given by the union of the acquired values Va and of the interpolated values Vi.

In accordance with a different example (in particular when the second sampling frequency is not a multiple of the first sampling frequency, and therefore not all of the first time instants $t_1$ coincide with corresponding second time instants $t_2$), the second succession of values V is given by the union of the interpolated values Vi and of several acquired values Va, or only by the interpolated values Vi.

In this manner, the claimed characteristics of the present control system 1 allow determining reliable values of the operative parameter P substantially for all the frames F of the video of the carousel 2 filmed by the video camera 6 of the electronic device 5.

This allows an operator to identify, for all the frames F of the video (and hence for all the positions of the carousel 2 represented in the latter) corresponding values that the operative parameter P took on in such frames F. Thus, the operator, for each acquired image of the carousel 2, can examine a corresponding value V of the operative parameter P and detect if possible irregularities of the position of the carousel 2 are correlated to such operative parameter P.

In this manner, the operator is capable of examining with extreme precision the operation of the carousel 2 and identifying, in a particularly efficient and reliable manner, if this has irregularities and the factors have led to such irregularities, being able to establish very precise correlations between the position of the carousel 2 and one or more of the operative parameters P of the latter.

Advantageously, the present control system 1 is particular recommended for carousels 2 whose movable members are moved very quickly, for example as in the roller coasters where the cars are moved even at several dozen meters per second. In such situations, the position taken on by the movable member from one frame F to the other of the video can change in a significant manner, and this the availability of values V of the operative parameters P in each frame F allows precisely identifying the specific configuration of the carousel 2 in which possible irregular values can be verified for the operative parameters P, therefore the detection, in the quickest and most reliable manner, of the causes of the encountered irregularities.

In particular, the present control system 1 provides that, during the acquisition of the video of the carousel 2, the electronic device 5 acquires (in the first data set) multiple operative parameters P (even several hundred) of the carousel 2, allowing the operator to verify numerous factors for each filmed position of the carousel 2.

Preferably, in the preferred case in which multiple operative parameters P of the carousel 2 are transmitted to the electronic device 5, the above-described operations for the single operative parameter P are applied to each of the received operative parameters P (or for a part of these).

Advantageously, in the case of transmission of multiple operative parameters P, the corresponding first successions of acquired values Va have the same first sampling frequency with the same first time stamp.

In addition, advantageously, the present control system 1 allows the operator to perform all of the aforesaid verifications directly onsite, in particular even without the presence of an Internet network for the transmission of the information to a remote processing station.

Preferably, the operations for executing the operations of synchronization and interpolation described above can be implemented by the processing unit 8 by means of programs installed directly in the electronic device 5 and/or programs on remote servers (also cloud).

Preferably, the aforesaid second data set is stored in the memory 11 of the electronic device 5, in particular in order to be subsequently accessible so as to show the relative information in the electronic device 5 itself or transmit to other devices (in particular also by means of cloud and/or web applications).

Figure 3:
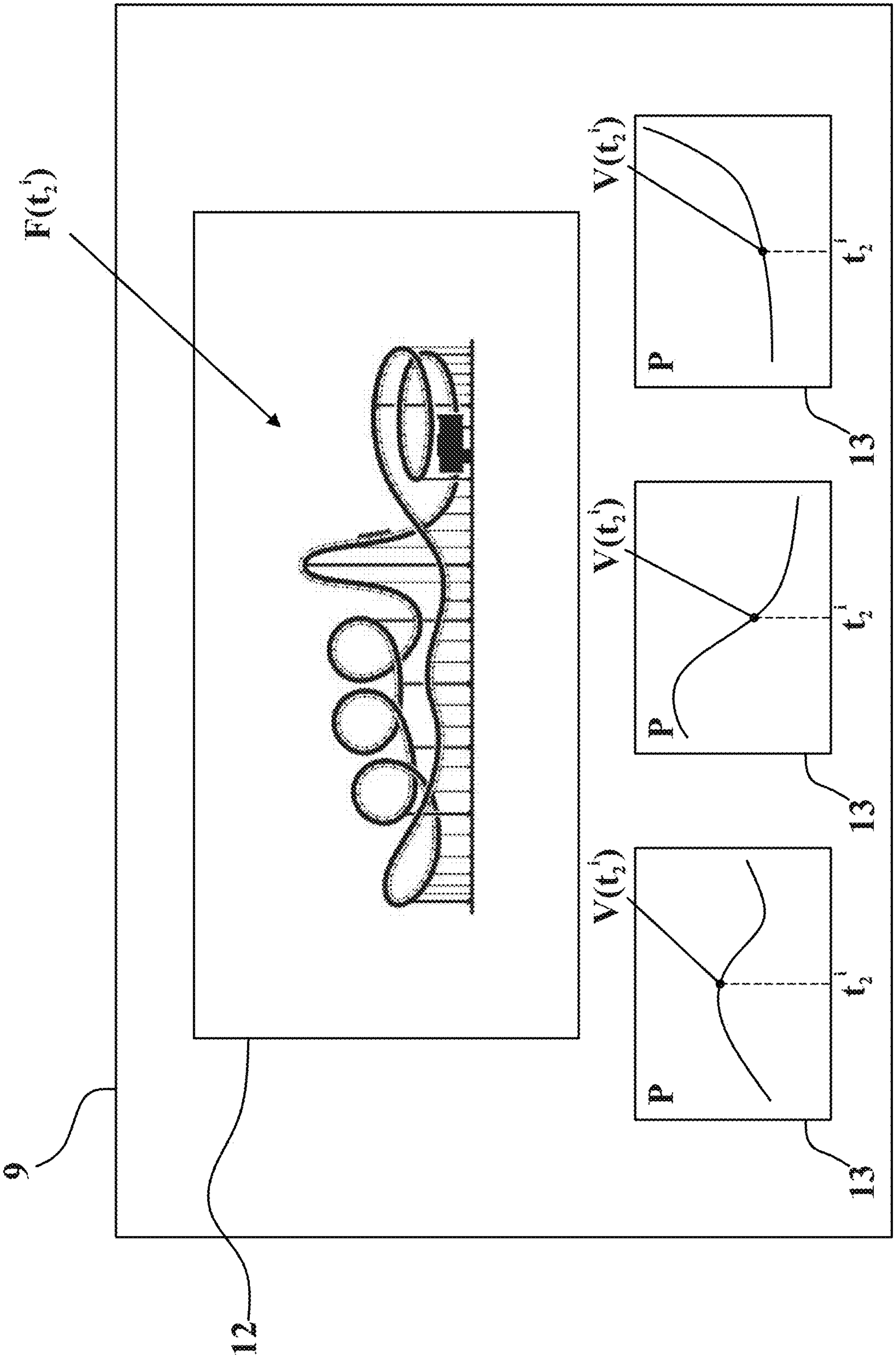
FIG. 3 shows an example of a possible display reproduced in a screen of the aforesaid electronic device.

Advantageously, with reference to the example of FIG. 3, the processing unit 8 of the electronic device 5 is arranged for actuating the screen 9 of the latter in order to reproduce, preferably in a first frame 12 of the screen 9 itself, a video given by the frames F generated by the video camera 6.

Preferably, such video is reproduced also substantially in real time during the time interval in which the video camera 6 films the carousel 2.

Of course, the electronic device 5 is actuatable by the operator to reproduce the video on its screen 9 even after the acquisition, in order to execute suitable re-examinations of the carousel 2 (in particular for comparing the images of the frames F with the values V of the operative parameter P).

Advantageously, the processing unit 8 of the electronic device 5 is arranged for actuating the screen 9 in order to reproduce, preferably in a second frame 13 of the latter, the second succession of values V of the operative parameter P, such that the operator can simultaneously observe the video and the progression of the operative parameter P. In particular, the screen 9 is arranged for displaying multiple second frames 13, so as to simultaneously represent multiple operative parameters P of the carousel 2 (as in the example of FIG. 3).

Advantageously, when each frame F is displayed on the screen 9, the processing unit 8 (in particular by means of the video module 10) commands the screen 9 to indicate the value V of the second succession of values V associated with the same second time instant $t_2$ of the displayed frame F.

Such indication can for example be implemented by reproducing the value V and/or by means of a suitable indication on a graph of the time progression of the operative parameter P (as in the example of FIG. 3).

In this manner, advantageously, the present control system 1 is capable of displaying, on the electronic device 5, each frame F of the video synchronized with the corresponding value V of the operative parameter P reasonably determined by the carousel 2 in the instant in which this is represented in such frame F.

Preferably, the interpolation function which the processing unit 8 implements for calculating the interpolated values Vi of the operative parameter P is executed in post-processing. Suitably, the display of the frames F and of the second succession of values V of the operative parameter P is implementable on the screen 9 of the electronic device 5 after the time interval in which the video camera 6 films the carousel.

Advantageously, the interpolation function comprises at least one linear interpolation function.

Preferably, the interpolation function is implemented by means of other interpolation methods, selected for example from among the following group of functions: a pattern recognition function, a bilinear interpolation function, a bicubic interpolation function, a Bezier interpolation function, a spline interpolation function.

Advantageously, the different types of interpolation function can be selected by the processing unit 8 based on the characteristics of the first received data set, for example from the progression of the acquired values Va and/or from the fact that in such first data set, sections with missing values are present.

In particular, it is possible that in the first succession of acquired values Va, gaps are present for one or more first time instants $t_1$ of the first time stamp, for example since they were not acquired by the control unit 3 (also for reasons linked to the sensors) or due to disturbances during the transmission between the carousel 2 and the electronic device 5.

In such case, the processing unit 8 is arranged for identifying such gaps and for calculating interpolated values Vi also at the first time instants $t_1$ affected by such gaps.

The calculation of such interpolated values Vi is also executed based on the available acquired values Va, in particular one or more sections of the first succession of the acquired values Va. Such calculation for example can be executed by means of a linear interpolation function or a pattern recognition function, based on the progression of the operative parameter P in the analyzed sections.

Advantageously, in the event in which the interpolation function is implemented by means of a pattern recognition function, the latter identifies at least one range of the first time instant $t_1$ in which the gap is present, and based on the acquired values Va in such range, defines a given pattern.

Hence, the function searches such specific pattern, in sections of the first succession which are prior to and/or following the gap, and selects a section in which a sequence of acquired values Va is present corresponding to the sought-after pattern. The function thus obtains, based on such sequence, the interpolated values V1 to be associated with the first time instant $t_1$ in which the gap is present.

Advantageously, with reference to the scheme of FIG. 1, the control system 1 comprises a remote server 14, which is in data communication, by means of Internet network, with the transmission unit 4 of the carousel 2 and with the communication unit 7 of the electronic device 5.

In particular, such remote server 14 can comprise a local computer (installed for example at the seat of the company charged with the maintenance of the carousels) and/or, possibly also in part, be implemented in cloud.

The transmission unit 4 is arranged for sending, to the remote server 14, a third data set containing a subsampling of the first succession of the acquired values Va of the operative parameter P, so as to make available the information of such third data set also to operators who operate remotely with respect to the site of the carousel 2.

Advantageously, the third data set is transmitted with a third sampling frequency (e.g. 10 Hz) smaller than the first sampling frequency with which the first data set is sent from the transmission unit 4 of the carousel 2 to the electronic device 5. This allows the remote server 14 to receive the third data set with a reduced delay and, therefore, allows the remote operators to substantially access in real time the values of the operative parameter P, nearly simultaneously with the operator onsite who is using the electronic device 5, for example by means of a video terminal 15 connected to the remote server 14.

Advantageously, the processing unit 8 of the electronic device 5 is arranged for commanding the communication unit 7 to send, to the remote server 14, a fourth data set containing the aforesaid second data set (comprising second succession of values V of the operative parameter P) and the video data acquired from the video camera 6. The information contained in such fourth data set are in this manner can be archived at the remote server 14 and in particular accessible also for remote operators in order to execute the control of the carousel 2 (as discussed above).

Also forming the object of the present invention is a control method for carousels, implemented in particular by means of the control system 1 of the above-described type.

Hereinbelow, for the sake of description simplicity, reference will be made to the same nomenclature introduced up to now, even if it must be intended that the present method can also be obtained with systems not provided with all of the above-considered characteristics. Advantageously, the control method is started by an operator by means of a given command of the electronic device 5, in particular simultaneously with the starting of the video camera 6 that films the carousel 2 (or a part of interest thereof) for a given time interval.

The control method for carousels according to the present invention comprises an acquisition step, in which the control unit 3 of the carousel 2 detects, at least in the aforesaid time interval, at least one operative parameter P associated with the carousel 2 itself. Advantageously, in such acquisition step the control unit 3 acquires multiple operative parameters P, directly or by means of sensor systems, in accordance with that discussed above.

The method also comprises a transmission step, in which the transmission unit 4 of the carousel 2 transmits, with a given first sampling frequency, a first data set containing a first time succession of acquired values Va of the operative parameter P which were acquired by the control unit 3 in the aforesaid time interval. In accordance with that discussed above, each acquired value Va is associated with a given first time instant $t_1$ determined by the first sampling frequency.

Preferably, according to a particular embodiment, the acquisition step is executed continuously from the control unit 3 (according to programmed settings of the latter), and the transmission unit 4 transmits to the electronic device 5 a subset of the data acquired by the control unit 3 relative to the time interval in which the filming of the video is carried out.

The method also comprises a reception step, in which the communication unit 7 of the electronic device 5 receives the aforesaid first data set from the transmission unit 4 of the carousel 2.

The method also comprises an image acquisition step, in which the video camera films the carousel 2 for the aforesaid time interval and acquires a time sequence of frames F.

As stated above, the start of the image acquisition step is advantageously actuated by the operator by means of the electronic device 5. Following such start, the processing unit 8 initializes the process of saving the video data generated by the video camera 6 and the first data set containing the acquired values Va of the operative parameters P and received by the transmission unit 4 of the carousel 2.

In the image acquisition step, the frames F are acquired from the video camera 6 with a given second sampling frequency greater than the first sampling frequency, in which each frame F is associated with a corresponding second time instant $t_2$ determined by such second sampling frequency.

The method also comprises a synchronization step, in which the processing unit 8 synchronizes the first time instants $t_1$ of the first time succession of acquired values Va of the operative parameter P with the second time instants $t_2$ of the time sequence of said frames, in a manner such to align at least the initial instant of the first and of the second time stamp respectively of the acquired values Va and of the frames F.

Advantageously, such synchronization step is implemented by subtracting, from the first time instants $t_1$, a delay time indicative of the transmission time of the first data set from the transmission unit 4 of the carousel 2 to the communication unit 7 of the electronic device 5, as discussed above.

The method also comprises an interpolation step, in which the processing unit 8 applies, to the first time succession of acquired values Va of the operative parameter P, at least one interpolation function, which, based on such acquired values Va, calculates interpolated values Vi of the operative parameter P which are associated with second time instants which are prior to and/or following each first time instant $t_1$.

In this manner, as described above in detail, the present control system 1 allows determining reliable values of the operative parameter P for all the frames F of the video of the carousel 2 filmed by the video camera 6 of the electronic device 5.

Advantageously, the interpolation step is implemented by using, as interpolation function, one or more of the following group: a linear interpolation function, a pattern recognition function, a bilinear interpolation function, a bicubic interpolation function, a Bezier interpolation function, a spline interpolation function.

Preferably, following the aforesaid interpolation step, the processing unit 8 generates a second data set containing a second succession of values of the operative parameter P obtained from the aforesaid interpolated values Vi and advantageously from the acquired values Va, wherein each value of such second succession is associated with a corresponding second time instant $t_2$.

In particular, the aforesaid second data set and the video data are stored in the memory 11 of the electronic device 5, and/or transmitted to the remote server 14 of the control system 1.

Advantageously, the control method comprises a display step, in which on one screen (in particular on the screen 9 of the electronic device 5), preferably in the first frame 12 of the screen 9, a video is reproduced that is formed by the frames F and, preferably in the second frame 13 of the screen 9, the second succession of values V of the operative parameter P.

When each frame F is displayed in the screen, also the value V of the second succession of values V is indicated therein that is associated with the same second time instant $t_2$ of the displayed frame F, preferably by means of the already discussed above.

Optionally, the aforesaid display step can be implemented also on a screen different from the screen 9 of the electronic device 5, for example on the video terminal 15 of the remote server 14.

The invention thus described therefore attains the pre-established objects.

The contents of the Italian patent application number 102023000005340, from which this application claims priority, are incorporated herein by reference.

The invention claimed is:

1. A control system for carousels, said control system comprising:
- a carousel comprising:
  - a control unit arranged for detecting at least one operative parameter associated with said carousel;
  - a transmission unit operatively connected to said control unit and arranged for transmitting a first data set containing a first succession of acquired values of said at least one operative parameter, with a first sampling frequency, wherein each said acquired value is associated with a corresponding first time instant determined by said first sampling frequency;
- a portable electronic device, which comprises:
  - a video camera,
  - a communication unit arranged for communicating with the transmission unit of said carousel;
  - a processing unit operatively connected to said video camera and to said communication unit, and arranged for:
    - actuating said video camera to film at least part of said carousel in a time interval, and to acquire, with a second sampling frequency greater than said first sampling frequency, a sequence of frames, wherein each said frame is associated with a corresponding second time instant determined by said second sampling frequency,
    - actuating said communication unit to receive, from said transmission unit, said first data set containing the acquired values of said at least one operative parameter which have been acquired by said control unit in said time interval,
    - synchronizing the first time instants associated with the first succession of acquired values of said at least one operative parameter with the second time instants associated with the time sequence of said frames,
    - applying, to the first succession of acquired values of said at least one operative parameter, at least one interpolation function, which, based on said acquired values, calculates interpolated values of said at least one operative parameter, said interpolated values being associated with said second time instants which are prior to and/or following each said first time instant,
    - generating a second data set containing a second succession of values of said at least one operative parameter, said second succession of values being obtained at least from said interpolated values, wherein each said value is associated with a corresponding said second time instant.

2. The control system of claim 1, wherein said electronic device comprises a screen;

wherein said processing unit is arranged for actuating said screen in order to:

reproduce said second succession of values of said at least one operative parameter (P) and at least one video formed by said frames, and when each said frame is displayed, indicate in said screen the value of said second succession associated with the same said second time instant of said frame which is displayed.

3. The control system of claim 1, wherein said electronic device comprises a memory, and wherein said processing unit is arranged for storing at least said second data set in said memory.

4. The control system of claim 1, wherein said processing unit is arranged for synchronizing said first time instants with said second time instants by subtracting, from said first time instants, a delay time determined by transmission of said first data set from said transmission unit to said communication unit.

5. The control system of claim 1, wherein said at least one interpolation function is selected from among at least one of the following group: a linear interpolation function, a pattern recognition function, a bilinear interpolation function, a bicubic interpolation function, a Bezier interpolation function, a spline interpolation function.

6. The control system of claim 1, further comprising a remote server placed in data communication, by means of an Internet network, at least with the transmission unit (4) of said carousel and with the communication unit of said electronic device;

wherein said transmission unit is arranged for sending to said remote server a third data set containing a subsampling of the first succession of acquired values of said at least one operative parameter, with a third sampling frequency smaller than said first sampling frequency.

7. A control method for carousels, wherein said control method is implemented by a control system which comprises:

a carousel comprising:

a control unit arranged for detecting at least one operative parameter associated with said carousel, a transmission unit operatively connected to said control unit;

a portable electronic device, which comprises:

a video camera, a communication unit arranged for communicating with the transmission unit of said carousel, a processing unit operatively connected to said video camera and to said communication unit;

wherein said control method comprises:

an acquisition step, in which said control unit detects, at least in a time interval, said at least one operative parameter associated with said carousel;

a transmission step, in which said transmission unit transmits a first data set containing a first time succession of acquired values of said at least one operative parameter (P), with a first sampling frequency, wherein each said acquired value is associated with a first time instant determined by said first sampling frequency;

a reception step, in which said communication unit receives, from said transmission unit, said first data set containing said first time succession of values of said at least one operative parameter acquired from said control unit in said time interval;

an image acquisition step, in which said video camera films at least part of said carousel in said time interval, and acquires, with a second sampling frequency greater than said first sampling frequency, a time sequence of frames, wherein each said frame is associated with a corresponding second time instant determined by said second sampling frequency;

a synchronization step, in which said processing unit synchronizes the first time instants of the first time succession of acquired values of said at least one operative parameter with the second time instants of the time sequence of said frames;

an interpolation step, in which said processing unit applies, to said first time succession of acquired values of said at least one operative parameter, at least one interpolation function, which, based on said acquired values, calculates interpolated values of said at least one operative parameter which are associated with second time instants which are prior to and/or following each said first time instant;

wherein, following said interpolation step, said processing unit generates a second data set containing a second succession of values of said at least one operative parameter, said second succession of values being obtained at least from said interpolated values, wherein each said value of said second succession is associated with a corresponding said second time instant.

8. The control method of claim 7, further comprising a display step, in which the following is reproduced on a screen:

said second succession of values of said at least one operative parameter and a video formed by said frames, and when each said frame is displayed, the value of said second succession associated with the same said second time instant of said frame, displayed, is indicated in said screen.

9. The control method of claim 7, wherein, in said synchronization step, said first time instants are synchronized with said second time instants by subtracting from said first time instants a delay time indicative of transmission time of said first data set from said transmission unit to said communication unit.

10. The control method of claim 7, wherein said at least one interpolation function is selected from at least one of the following group: a linear interpolation function, a pattern recognition function, a bilinear interpolation function, a bicubic interpolation function, a Bezier interpolation function, a spline interpolation function.

* * * * *